United States Patent [19]

Baker et al.

[11] 4,102,955
[45] Jul. 25, 1978

[54] APPARATUS FOR AND METHOD OF HEAT CURING ELECTRICAL INSULATION PROVIDED ON A CENTRAL ELECTRICAL CONDUCTOR OF AN ELECTRICAL CABLE

[75] Inventors: John E. Baker, Wilmington, Del.; Charles C. Shackford, West Chester, Pa.

[73] Assignee: Reynolds Metals Company, Richmond, Va.

[21] Appl. No.: 799,610

[22] Filed: May 23, 1977

Related U.S. Application Data

[62] Division of Ser. No. 575,943, May 9, 1975, Pat. No. 4,043,722.

[51] Int. Cl.² .................. B29H 5/26; B29G 7/00
[52] U.S. Cl. ...................... 264/25; 264/174; 264/271; 264/345
[58] Field of Search .............. 264/22, 25, 27, 234, 264/236, 237, 345, 347, 171, 271; 219/6.5, 10.67, 10.75, 10.73, 10.79, 469; 425/174, 174.4, 174.6, 174.8, 143, 144, 383, 384, 406, 445

[56] References Cited

U.S. PATENT DOCUMENTS

| | | | |
|---|---|---|---|
| 1,876,745 | 9/1932 | Potter | 264/25 |
| 2,359,285 | 10/1944 | Bennett | 219/10.79 |
| 2,581,231 | 1/1952 | Berggren | 264/347 |
| 3,320,398 | 5/1967 | Armstrong | 219/10.79 |
| 3,354,243 | 11/1967 | Dodge | 264/25 |
| 3,440,384 | 4/1969 | Schroeder | 219/10.79 |
| 3,448,233 | 6/1969 | Landis | 219/469 |
| 3,479,419 | 11/1969 | Hochhauser | 264/25 |
| 3,503,823 | 3/1970 | Richart et al. | 428/461 |
| 3,642,532 | 2/1972 | Greene | 427/46 |
| 3,936,523 | 2/1976 | Kleeberg et al. | 264/236 |

Primary Examiner—Willard E. Hoag
Attorney, Agent, or Firm—Glenn, Lyne and Clark

[57] ABSTRACT

An apparatus for and method of heat curing elastomeric electrical insulation on a central electrical conductor of an electrical cable is provided and the apparatus includes an outer housing which is adapted to contain means for curing the exterior portion of the insulation from its outer portion inwardly and an electrical induction coil for curing the insulation from its inner portion outwardly. The coil is supported concentrically within the housing with the coil being adapted to receive the conductor therethrough with its insulation thereon and the coil serves to heat the conductor which in turn transmits heat to the inner portion of the insulation to provide the heat curing thereof from the inner portion radially outwardly. A magnetic flux shield is provided between the housing and the coil and serves to provide a path of least resistance for the lines of magnetic flux generated by the coil to thereby assure efficient operation of the induction coil yet without detrimental heating of the outer housing.

7 Claims, 9 Drawing Figures

APPARATUS FOR AND METHOD OF HEAT CURING ELECTRICAL INSULATION PROVIDED ON A CENTRAL ELECTRICAL CONDUCTOR OF AN ELECTRICAL CABLE

This application is a division of application Ser. No. 575,943, filed May 9, 1975, now U.S. Pat. No. 4,043,722, issued Aug. 23, 1977.

BACKGROUND OF THE INVENTION

In the manufacture of electrical cables and particularly the manufacture of so-called solid dielectric type cables having layers of heat-curable elastomeric material therearound wherein at least one of such layers serves as an electrical insulating layer, various apparatus and methods have been proposed heretofore for applying the elastomeric material concentrically around the central conductor and then heat curing the elastomeric material in a continuous process. For example, it is known to heat cure the interior portion of such heat-curable elastomeric material by utilizing an induction heating coil to heat the central conductor and thus effect heat curing of the interior portion of such material radially outwardly. It has also been proposed to provide heat curing of electrical insulation which is around an electrical conductor by passing the insulated conductor through a heated environment to effect heat curing from the exterior portion radially inwardly.

However, while these basic heat curing techniques are known, it is difficult to heat cure an elastomeric material provided around an electrical conductor in a precisely controlled substantially uniform manner throughout its thickness so as to not over cure by over heating the interior portion and/or the exterior portion of such elastomeric material or under cure by not heating enough.

Another difficulty in using an induction heating coil to provide induction heating of a central electrical conductor and thus heat the elastomeric material from its inner portion radially outwardly simultaneously with the external heating of such elastomeric material from its outer portion inwardly is that it is generally necessary to make the supporting structure which is required to support the heating coil and/or contain or support the external heating means of a material which is either electrically conductive or magnetic. However, in making such supporting structure of electrically conductive or magnetic materials it has been found that there is excessive heat build-up of the structure due to energy losses resulting in overheating of the structure with possible failure of its mechanical properties and an excessive loss of energy making it impractical to heat the central electrical conductor.

SUMMARY

This invention provides an improved apparatus for and method of curing a heat-curable elastomeric material used for electrical insulation on an electrical cable and such apparatus and method enable precise curing of such elastomeric material while avoiding the problems and difficulties of previous apparatus and methods.

In particular, this invention employs an apparatus which has an outer housing which is adapted to contain means for curing the exterior portion of the insulation from its outer portion inwardly and an electrical induction coil for curing the insulation from its inner portion outwardly. The coil is supported concentrically within the housing with the coil being adapted to receive the conductor therethrough with its insulation thereon and the coil serving to heat the conductor which in turn transmits heat to the inner portion of the insulation to provide the heat curing thereof from the inner portion radially outwardly. A magnetic flux shield is provided between the housing and the coil and serves to provide a path of least resistance for the lines of magnetic flux generated by the coil to thereby assure efficient operation of the induction coil yet without detrimental heating of the outer housing.

Other details, uses, and advantages of this invention will be readily apparent from the exemplary embodiments thereof presented in the following specification, claims, and drawings.

BRIEF DESCRIPTION OF THE DRAWINGS

The accompanying drawings show present exemplary embodiments of this invention, in which.

DETAILED DESCRIPTION

Figure 1:
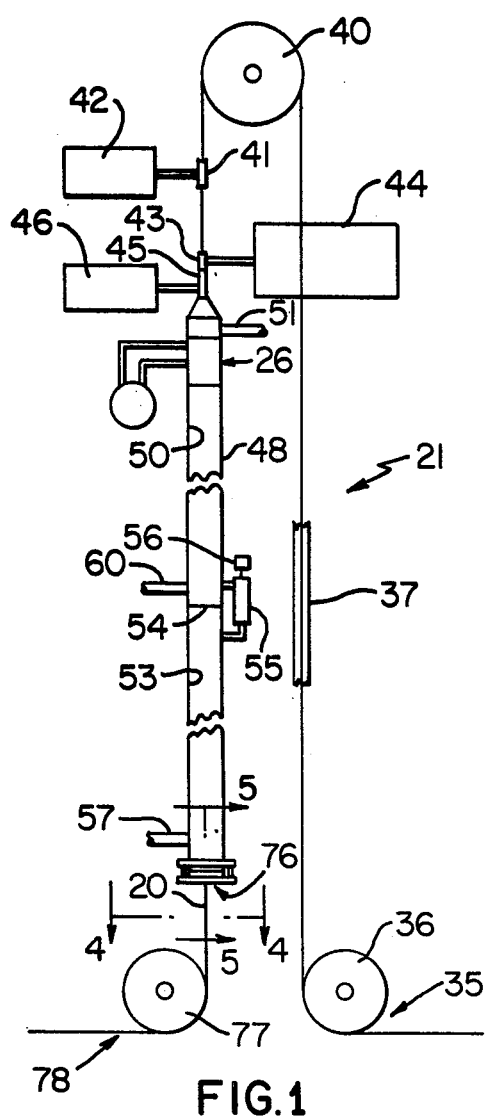
FIG. 1 is a primarily schematic presentation with parts broken away particularly illustrating one exemplary embodiment of the apparatus and method of this invention.
Figure 4:
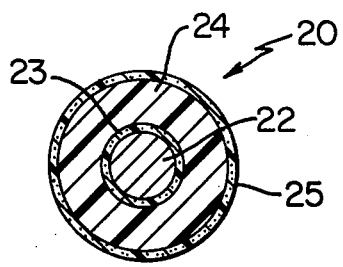
FIG. 4 is a cross-sectional view taken essentially on the line 4—4 of FIG. 1.

Reference is now made to FIG. 1 of the drawings which illustrates one exemplary embodiment of the apparatus and method of this invention which is particularly adapted to heat cure heat curable elastomeric material which is used to define electrical insulation provided on a central electrical conductor to define electrical cable 20 and such apparatus and method is designated generally by the reference numeral 21. The apparatus and method 21 enables the continuous manufacture of the electrical cable 20 and as illustrated in FIG. 4 such cable comprises a central electrical conductor 22 which is surrounded by a semi-conducting shield in the form of a tubular sleeve 23, a comparatively thick electrical insulation layer in the form of a tubular insulator 24, and an outer insulation shield or jacket 25.

In this example, the conductor shield 23 is made of a semi-conducting elastomeric material such as partially carbon filled cross-linked polyethylene which provides a smooth electrical surface in contact with the tubular insulator 24; and, the insulator 24 is also made of a suitable elastomeric material such as cross-linked polyethylene. The outer shield or cover 25 is also made of a suitable elastomeric material such as carbon filled cross-linked polyethylene and tends to provide both an electrical shield and a covering for the tubular insulator 24.

Any suitable elastomeric material may be used in each layer of an electrical conductor such as conductor 20, including natural and synthetic rubbers and suitable synthetic plastic materials. In the conductor 20, for example, where polyethylene is used the various layers 23, 24, and 25 have had the molecules thereof cross-linked by a heat curing action and such heat curing is achieved in accordance with the teachings of this invention. The heat curing and hence cross-linking of the polyethylene is achieved at a heating station 26 by heating the central conductor to thus provide cross-linking of layers 23–25 from the inner portions thereof radially outwardly. Simultaneously the layers 23–25 are started to be heated at station 26 from the outer layer 25 radially inwardly by suitable heating means in the form of steam, in this example. Thus, heat curing or cross-linking is achieved in two directions in a simultaneous and precisely controlled manner by precise temperature control.

The precise temperature control which provides controlled heat curing both radially inwardly and outwardly through layers 23–25 is made possible due to this invention as will now be explained. In particular, the heating of the conductor 22 at station 26 is provided by induction heating means which will be referred to hereinafter as either apparatus 27 or device 27, see FIGS. 1–3, which comprises an induction coil 30. The coil 30 employs a magnetic shield 31 which may be considered a magnetic flux pipe 31 and such shield or pipe is arranged between an outer housing 32 of the device 27 and the coil 31. The shield 31 serves to provide a path of least resistance for the lines of magnetic flux outside of the coil 30 and thereby prevents excessive heating of the housing 32 which would occur without such shield and would be very undesirable. The net effect is to assure efficient induction heating of the solid conductor 22 with its sleeves 23–25 as it passes through the heating station 26.

The apparatus 21 enables efficient and continuous manufacture of electrically insulated cable 20 while assuring that the insulation provided by elastomeric layers 23–25 is of high quality. Referring now to FIG. 1, the conductor 22 is moved into the apparatus 21 as illustrated at 35 from a suitable supply thereof (not shown) and the conductor 22 is moved around a turn roll 36 and moved upwardly through a preheat tube 37 which provides initial preheating of the central conductor 22 to a temperature which is particularly adapted to receive the first elastomeric layer 23 thereagainst. The preheat tube 37 may provide its heating action using any suitable apparatus or means known in the art.

After the preheated conductor 22 exits the preheat tube 37 it passes around another turn roll 40 and through an extrusion die 41 of an extrusion apparatus 42 where the layer 23 is extruded therearound and such layer is in the form of a sleeve which may be of the order of 0.030 inch thick. The conductor 22 with the sleeve 23 therearound is then continued through a die 43 of an extrusion apparatus 44 which extrudes a comparatively thick tubular insulator 24 concentrically around the sleeve 23; and, the conductor 22 with the sleeve 23 and tubular insulator 24 therearound is continued through an extrusion die 45 of another extrusion apparatus 46 where the outer jacket or sleeve layer 25 is extruded concentrically against the tubular insulator 24 and the jacket 25 may be generally of the order of 0.030 inch thick.

The conductor with its plurality of elastomeric layers 23, 24, and 25 is then moved through the apparatus 27 at the heating station 26 where the induction coil 31 provides heating of the layers 23–25 from the interior radially outwardly in the manner previously mentioned while simultaneously there is a heating provided by steam that commences at the heating station 26 and the heating action is from the outer layer 25 inwardly toward the inner layer 23, whereby a substantially simultaneous heating of the layers 23, 24, and 25 provides a controlled heating action and provides heat curing and cross-linking of the elastomeric material utilized to define the layers 23–25. The layers 23–25 of the electrical cable 20 are thus precisely cross linked.

After leaving the heating station 26, the conductor 22 with its three concentric elastomeric layers 23–25 continues through a comparatively long tube 48 which has a steam chamber 50 defined in its upper portion. The steam is provided to chamber 50 through an inlet 51 to provide a further heat-curing or cross-linking action. The electrical conductor 22 with its layers 23–25 therearound is then continued through a cooling chamber 53 and such cooling chamber is, in essence, provided by the lower portion of the tube 48 which is filled with cooling water to a level 54 indicated by a level control device 55, or the like. The device 55 has a control 56 at the upper portion thereof which controls flow of cooling water through an inlet 57 to the chamber 53 and hot water is continuously bled away from an outlet 60 in the chamber 53. It will be appreciated that there will be a continuous condensation of steam from the upper portion of the tube 48, i.e., steam chamber 50, into the lower chamber 53. The rate of bleed of hot water through outlet 60 may be adjusted either manually or automatically and the device 56 provides precise control of the flow of cold water through inlet 57 into the chamber 53 to maintain the steam-water interface at 54.

To obtain a concept of the action which takes place in the elongated tube 48, it will be appreciated that steam under pressure generally of the order of 150–325 PSI is supplied to the steam chamber 50. The steam chamber 50 is generally of the order of 60 feet in vertical height whereby steam heating of the layers 23–25 is provided over the entire vertical height of the steam chamber 50. The device 27 at the heating station 26 is about 16 inches in vertical height and because steam surrounds the coil 30 provides a dual heating action by heating the layers 23–25 by electrical induction heating from the inside out and by steam from the outside in. However, the main heating of the layers 23–25 from the outside in is provided by steam throughout the height of the steam chamber 50; and, the steam chamber 50 and device 27 may be considered as providing a dual heating of layers 23–25 from the outside in and inside out respectively.

The cold tap water which is employed in chamber 53 is generally at a pressure of the order of 150 to 325 PSI; and, the length of the cooling chamber 53 is generally of the order of 120 feet whereby as the conductor 22 with its three layers 23–25 of cross-linked polyethylene therearound travels along the vertical height of the cooling chamber 53, cooling is achieved over substantially the entire 120 foot vertical height.

The concept of this invention enables efficient continuous manufacture of electrical cable 20, due to precisely controlled continuous curing of sleeves 23–25; and, cable 20 processed in accordance with this invention may be made so that it is capable of withstanding electrical stresses as great as 140 thousand volts whereby the comparatively thicker insulation required for 140 KV cable may be easily made employing this invention.

Figure 2:
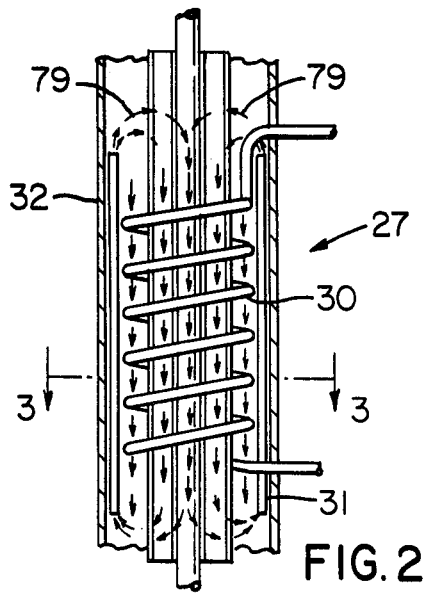
FIG. 2 is a schematic presentation particularly illustrating the construction of an apparatus of this invention which employs an electrical induction coil and a magnetic shield which serves as a magnetic flux pipe to provide a path of least resistance for the magnetic flux lines outside the induction coil and assure efficient operation of the induction coil.
Figure 3:
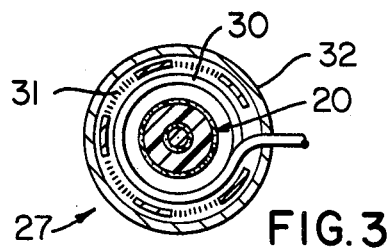
FIG. 3 is a view taken essentially on the line 3—3 of FIG. 2.
Figures 6, 7:
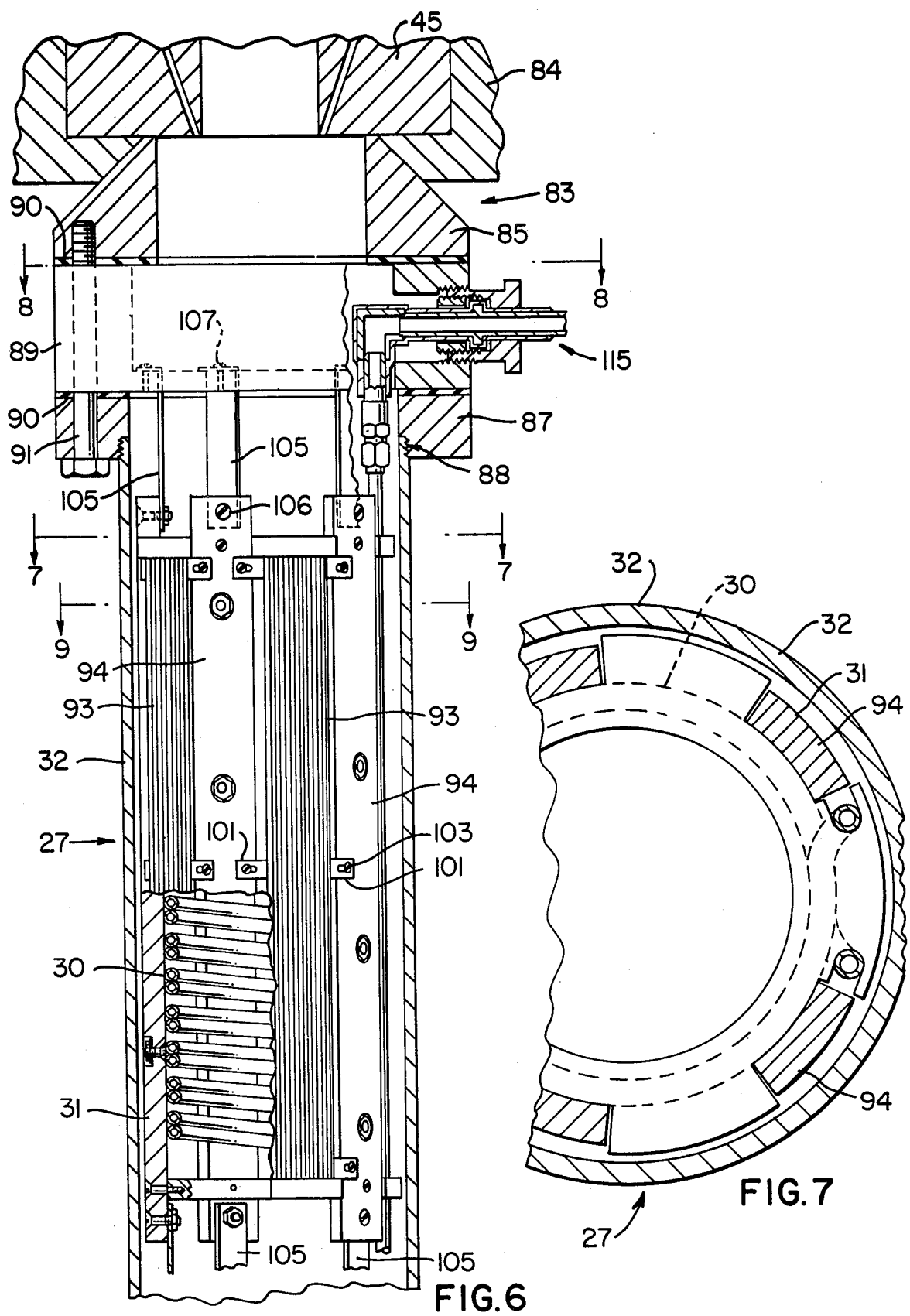
FIG. 6 is a view with parts in cross section, parts in elevation and parts broken away particularly illustrating the induction coil with its magnetic flux shield comprising the apparatus and method of this invention.
FIG. 7 is a fragmentary cross-sectional view taken essentially on the line 7—7 of FIG. 6.
Figure 8:
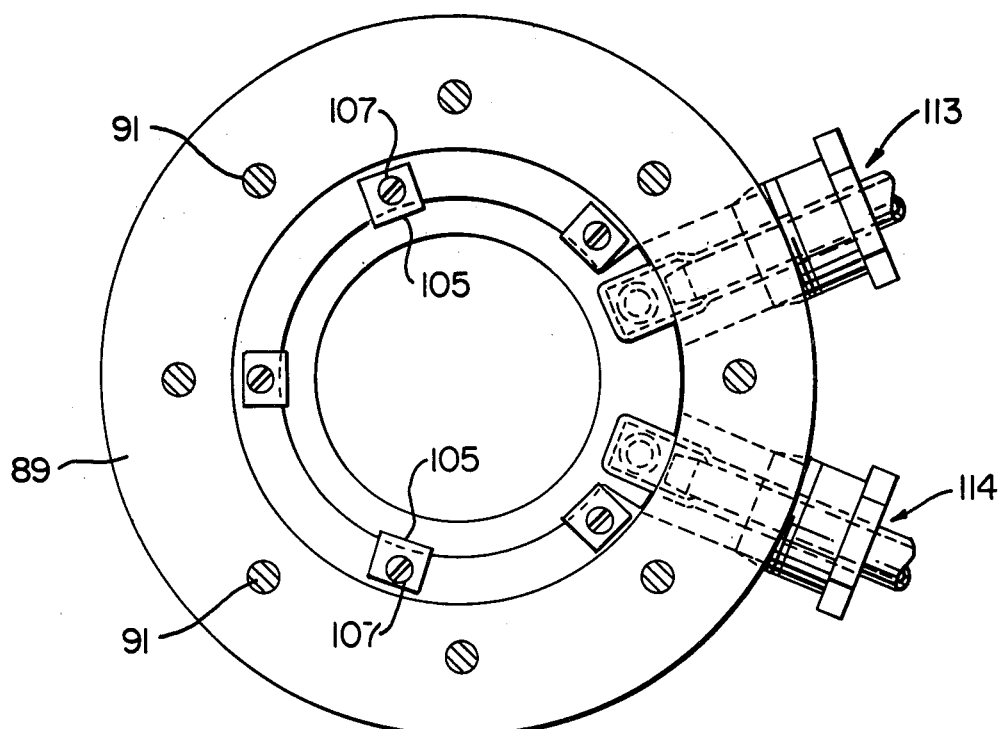
FIG. 8 is a view taken essentially on the line 8—8 of FIG. 6.

To assure efficient heating of the conductor 22 in a continuous process so that elastomeric material near the conductor itself will be precisely cured or cross-linked, this invention utilizes an alternating current induction heating coil 30, see FIGS. 2 and 6, which operates at frequencies in the range of 7500 to 30,000 Hertz. The induction heating coil 30 provides comparatively high substantially instantaneous heating of the conductor 22 as it moves through the heating station 26 and results in the heat being conducted outwardly into the cable insualtion particularly the cable insulation adjoining the conductor itself which is difficult and time consuming to precisely cross-link using techniques wherein only exterior heat is employed. The induction heating technique lends itself to precise temperature control and hence precise heating of the cable insulation from the inside out as each section of cable moves through the heating station 26.

Figure 5:
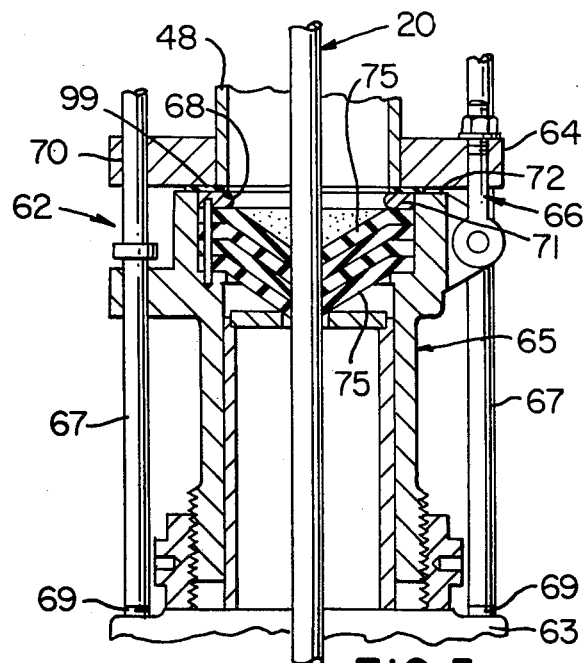
FIG. 5 is a fragmentary cross-sectional view taken essentially on the line 5—5 of FIG. 1.

The apparatus 21 has seal means in the form of a seal device 62, see FIG. 5, provided at the bottom of the elongated tube 48; and, the seal device 62 provides a fluid seal between the cable 20 and the cooling chamber 53 as the cable is moved continuously out of such cooling chamber. The seal device 62 comprises bottom and top structural members 63 and 64 respectively having a seal housing assembly 65 arranged therebetween. The housing assembly 65 is fixed to the upper structural member 64 by a plurality of circumferentially spaced nut and bolt assemblies 66.

A plurality of rods 67 are provided for holding the seal device 62 in sealed engagement against the lower annular edge 68 of the tube 48. The rods 67 have bottom portions 69 threadedly fastened to the bottom structural member 63 and extend through opening 70 in the top member. Suitable means (not shown) is provided for urging the lower structural member 63 and thus housing assembly 65 supported thereon upwardly causing the inner portions of a compressible fluid seal 99 to be compressed between a ring 71 provided at the upper portion of the housing assembly 65 and the annular surface 68 defining the bottom edge of the tube 48. The outer portion of the seal 99 is compressed between a top annular edge 72 of the housing assembly 65 and the bottom member 64.

The main seals of the device 62 which assure that the cable 20 may be moved out of the tube 48 without leakage are in the form of a plurality of sealing members each designated by the reference numeral 75. The members 75 are made of a suitable elastomeric sealing material capable of providing a fluid seal against the outer sleeve or layer 25 of the cable 20 with continuous movement of the cable 20 (with its sleeves 23, 24, and 25 now cured thereon) out of the tube 48. The cable 20 exits the device 62 as illustrated at 76 in FIG. 1 and is moved around a turn roll 77 whereupon it is moved away from the turn roll 77 as illustrated at 78 for further processing or utilization, as desired.

In using steam to provide external heating of layers 23–25, and particularly steam at the pressures mentioned herein, it is impractical if not impossible to use materials other than metallic materials and particularly those which are either made of electrically conductive materials or magnetic materials to make the steam-containing housing 32.

In using the device 27 with its coil 30, energy is transferred from the coil 30 into the metal conductor 22 by magnetic lines of flux (indicated by arrows 79 in FIG. 2) radiating from the coil 30. The magnetic lines of flux pass through the center of the induction coil and return around the outside of such coil. When these lines of magnetic flux cut through the conductor 22 they induce an electrical potential therein at right angles to the flux lines causing a current to flow in such conductor which is directly proportional to the induced potential and inversely proportional to the impedance of the current path whereby energy will be expended in the form of heat thereby heating the conductor 22.

Without the unique flux shield 31 comprising the device 27 the flux lines returning on the outside of the coil 30 would react in the same manner as those within the coil thereby resulting in heating of the housing 32. This heating would ordinarily become substantial and excessive resulting in a reduction in the efficiency of heating of the conductor 22 during movement through the device 27 whereby efficient curing or cross-linking could not be achieved from the conductor 22 outwardly through its layers 23–25. Any excessive heating of housing 32 by the action of coil 30 would result in a reduction in the mechanical strength of the housing and failure of the equipment could occur.

However, as previously suggested and as illustrated schematically in FIG. 2, the magnetic flux shield 31 serves as a magnetic flux pipe 31 which provides a path of least resistance for the flux lines outside the coil 30. Therefore, with shield 31 the housing 32 will not be heated due to lines of magnetic flux cutting thereacross whereby the action of the induction coil 30 may be concentrated upon and more precisely controlled to provide induction heating of the conductor 22 as it moves through the device 27 while the steam surrounding the coil 30 and provided within the housing 32 may be precisely controlled in temperature and pressure to provide the heating action outside of the cable 20 from the outer layer 25 inwardly to the inner layer 23 thereof.

As will be readily apparent from FIG. 6 of the drawings, the device 27 is fixed in position in the apparatus 21, as shown at 83 in FIG. 6; and, the extrusion die 45 is suitably fixed to the apparatus 46 by a supporting member 84. Apparatus 46 also has a supporting member 85 associated therewith which is fixed to the device 27 as will be described subsequently. A metal-to-metal seal between adjoining surfaces of members 84 and 85 is provided by continuous upward pressure suitably exerted by the outer housing 32 of device 27. However, members 85 may be held sealed against member 84 using any suitable technique or means known in the art.

The device 27 also has an adapter ring 87 which is threadedly fastened to the upper portion of the housing 32 as illustrated at 88. The device 27 includes an upper structural portion 89 which is sandwiched between the adapter ring 87 and member 85 with a pair of seals 90 on opposite sides thereof. A plurality of threaded bolts 91 are employed to fix the ring 87 to the supporting member 85.

As best seen in FIGS. 6–9 of the drawings, the shield 31 is comprised of a plurality of shield sub-assemblies each designated by the same reference numeral 93. The shield sub-assemblies 93 are supported by elongated circumferentially spaced supporting members 94, see FIG. 9, which are arranged within housing 32 of the device 27 while being radially inwardly spaced therefrom. Each shield sub-assembly is comprised of a plurality of ferroresonant laminations 95. The laminations 95 are in the form of elongated flat laminations which have the appearance of ribbon-like strips and each lamination has a rectangular cross-sectional configuration.

The laminations 95 are electrically insulated from each other using any suitable electrical insulating material or coating and such laminations 95 are held together by a plurality of axially spaced fastening assemblies 96 each comprised of an elongated rod-like member 97 having externally threaded opposite end portions and having threaded nuts 100 which are threadedly fastened over the threaded end portions. Each sub-assembly 93 also has L-shaped brackets 101 each of which has one leg thereof fastened to an associated sub-assembly 93 by an associated fastening assembly 96 and an oppositely arranged leg thereof fastened to an associated supporting member 94 by nut and bolt assemblies 103, whereby the sub-assemblies 93 and supporting structures 94 are suitably fastened together and arranged to define a substantially tubular configuration as illustrated in FIG. 9 of the drawings.

The device 27 has a plurality of supporting struts 105 for its coil 30 and shield 31 and each strut 105 has one end thereof suitably detachably fastened to an associated supporting member 94 as illustrated at 106 in FIG. 6 and has its opposite end suitably detachably fastened to an associated member or structural portion 89 as shown at 107. The device 27 also has supporting struts 105 at its opposite lower end which may be used to fasten the lower portions of the coil 30 and shield 31 to an associated lower supporting member (not shown) and such lower supporting member may employ suitable transition members enabling the lower portion of the device 27 and in particular its housing 32 to be securely fastened in a fluid-tight manner to the tube 48. The lower supporting struts 105 may be also used to fasten the coil 30 and shield 31 to another device 27 so that two or more devices 27 may be attached in aligned relation to provide induction heating of a cable when the induction heating required is more than can be provided by only one device 27. It will also be appreciated that instead of providing a separate outer housing 32 (as shown) for a device 27 such device may, if desired, employ the upper portion of the tube 48 as its housing. In this latter instance, suitable members may be attached, if desired, to the lower struts 105 and the inside of the tube 48 to stabilize the lower portion of the coil 30 and shield 31.

Figure 9:
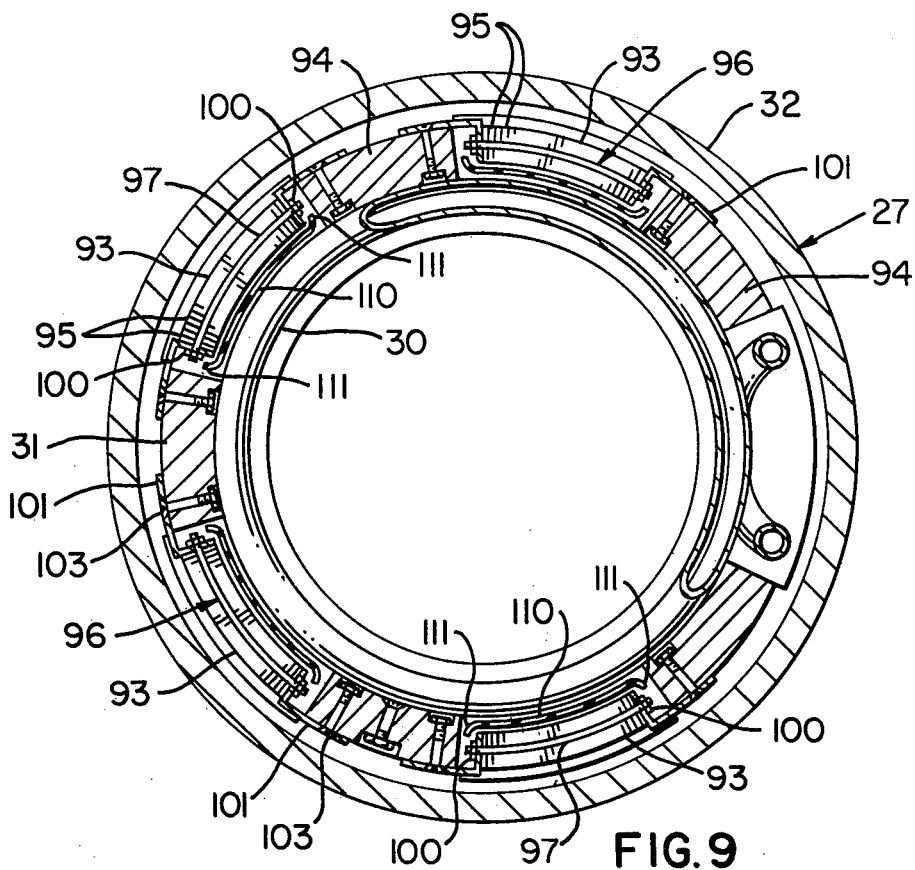
FIG. 9 is a view taken essentially on the line 9—9 of FIG. 6.

As seen in FIG. 9, electrical insulation is provided between each shield sub-assembly 93 and the coil 30; and, such insulation is in the form of an elongated cover 110 extending the full vertical height of the coil 30 and supported by any suitably means. Each cover 110 has arcuate vertically extending edges 111 which curve around opposite vertical edges of an associated sub-assembly.

The device 27 employs four sub-assemblies 93 which extend around the major portion of the circumference of the apparatus 27 and in this example extend through an arc of approximately 270°. It will also be noted that the coil 30 of the apparatus 27 has suitable connections as shown at 113 and 114 in FIG. 8. In addition, the coil 30 is a tubular water-cooled coil which is particularly adapted to have cold tap water circulated therethrough and one of the connections for such coil is shown at 115 in FIG. 6.

In this disclosure of the invention reference has been made to the fact that the layer 23 and the layer 25 may be made of polyethylene 0.030 inch thick; however, it will be appreciated that layer 23 may be made of any suitable elastomeric material and may range in thickness from 30 to 90 mils while layer 25 may be made of any suitable elastomeric material and may range from 20 to 60 mils thickness. In addition, the insulation comprising the tubular insulator 24 may range in thickness from 0.3 to 1.2 inches depending upon the end application.

In this disclosure of the invention the description refers to the utilization of a central electrical conductor 22 of solid cross section; however, it will be appreciated that such conductor need not necessarily be solid but may be a stranded conductor of any suitable type commonly used in the electrical industry.

While present exemplary embodiments of this invention, and methods of practicing the same, have been illustrated and described, it will be recognized that this invention may be otherwise variously embodied and practiced within the scope of the following claims.

What is claimed is:

1. A method of continuously heat curing heat-curable electrical insulation provided on an electrical conductor comprising the steps of, passing the conductor with uncured heat-curable electrical insulation thereon through a tubular electrical induction coil supported concentrically within an outer housing made of an electrically conductive material and substantially avoiding detrimental induction heating of said outer housing by use of a magnetic flux shield arranged within said housing and surrounding said induction coil, and flowing an alternating electrical current through said coil at a frequency ranging between 7,500 and 30,000 Hertz while passing the insulated structure therethrough to thereby heat said conductor which in turn transmits heat to the inner portion of the insulation to provide heat curing thereof from said inner portion radially outwardly, said shield providing a path of least resistance for lines of magnetic flux generated by said coil to thereby prevent said housing from being heated excessively and assuring precision heating of said conductor.

2. A method as set forth in claim 1 in which said passing step comprises passing the conductor through said coil having said shield which is comprised of a plurality of ferroresonant laminations which are arranged in a roughly tubular configuration around said coil and with said laminations being electrically insulated from each other to thereby prevent current flow and energy loss therebetween.

3. A method as set forth in claim 1 in which said step of flowing an electrical current through said coil is achieved while simultaneously cooling said tubular coil by flowing cooling water therethrough.

4. A method as set forth in claim 1 particularly adapted to heat electrical insulation made of crosslinkable polyethylene and is provided on the electrical conductor and wherein the heating of said conductor transmits heat to the inner portion of the polyethylene insulation to provide curing by cross-linking thereof.

5. A method as set forth in claim 1 comprising the preparation step of preheating the electrical conductor prior to providing the electrical insulation thereon.

6. A method as set forth in claim 1 and comprising the further step of cooling the electrical conductor and its heat-cured electrical insulation by passing same through a cooling chamber.

7. A method as set forth in claim 1 and comprising the further step of providing steam within said outer housing to provide heat curing of the heat-curable electrical insulation from the outer portion of such insulation radially inwardly toward such conductor simultaneously with the heat curing from the inner portion of the insulation radially outwardly to the outer portion as provided by heating said conductor.

* * * * *